United States Patent [19]

Franck et al.

[11] 3,923,915

[45] Dec. 2, 1975

[54] ISOMERIZATION OF SATURATED ALIPHATIC AND NAPHTHENIC HYDROCARBONS WITH A CATALYST CONTAINING A HYDROCARBYL-AROMATIC COMPOUND

[75] Inventors: Jean-Pierre Franck, Bougival; Bernard Torck, Boulogne-sur-Seine; Jean-François Le Page, Rueil-Malmaison, all of France

[73] Assignee: Institut Francais du Petrole, Rueil-Malmaison, France

[22] Filed: Aug. 29, 1974

[21] Appl. No.: 501,698

[30] Foreign Application Priority Data

Aug. 30, 1973 France............................ 73.31480

[52] U.S. Cl. ..................... 260/666 P; 260/683.76
[51] Int. Cl.$^2$............................................ C07C 3/56
[58] Field of Search ....... 260/683.75, 666 P, 683.76

[56] References Cited

UNITED STATES PATENTS

| | | | |
|---|---|---|---|
| 2,468,746 | 5/1949 | Greensfelder et al. | 260/683.75 |
| 2,475,358 | 7/1949 | Moore et al. | 260/683.75 |
| 3,248,343 | 4/1966 | Kelly et al. | 260/683.75 |
| 3,285,990 | 11/1966 | Kelly et al. | 260/683.75 |
| 3,870,653 | 3/1975 | Torck et al. | 260/683.76 |

*Primary Examiner*—Delbert E. Gantz
*Assistant Examiner*—G. J. Crasanakis
*Attorney, Agent, or Firm*—Millen, Raptes & White

[57] ABSTRACT

An isomerization catalyst is manufactured by admixing an alumina carrier with a hydrogenating metal compound, an aluminum halide or a hydrocarbylaluminum halide and an aromatic poly (hydroxy, oxo and/or hydrocarbyloxy) compound.

The resulting catalyst may be used for isomerizing saturated aliphatic or naphthenic hydrocarbons at 25°–400°C, particularly at 80°–200°C.

10 Claims, No Drawings

ISOMERIZATION OF SATURATED ALIPHATIC AND NAPHTHENIC HYDROCARBONS WITH A CATALYST CONTAINING A HYDROCARBYL-AROMATIC COMPOUND

The invention concerns a new catalyst and its use in reactions of hydrocarbon conversion requiring a catalyst of very active and selective acidity. The invention more precisely, concerns a catalyst comprising alumina combined with an aluminum halide and at least one hydrocarbylaromatic compound substituted with at least two hydroxy (—OH) and/or oxo (=O) and/or hydrocarbyloxy (—OR where R is a monovalent hydrocarbon radical) groups. The catalyst may also comprise a metal or a compound of a metal of any of groups VI and/or VIII of the periodic classification.

The invention also concerns the use of this catalyst for isomerizing saturated aliphatic or naphthenic hydrocarbons at a relatively low temperature. The resulting products are very interesting as blending components for manufacturing high octane gasolines.

At high temperature, i.e., above 300°C, the isomerization of $C_4$, $C_5$ and $C_6$ saturated hydrocarbons may be carried out with conventional catalysts of the platinum alumina type having a chlorine content of about 1%. Since the thermodynamic stability of isoparaffins is poorer and poorer as the temperature increases, the isoparaffins contents at the thermodynamic equilibrium for such temperature is not sufficiently high for obtaining high octane effluents and it is necessary to separate the n-paraffins and optionally to recycle them. It is possible to carry out this reaction at a lower temperature by using aluminum chloride catalysts, said aluminum chloride being, for example, deposited on platinum containing alumina. Irrespective of the manner according to which aluminum chloride is supplied to the catalyst, these catalysts have a low activity or, in any case, deactivate quickly, so that, in order to maintain their catalytic activity, it is necessary to continuously inject into the charge, a promoter such as free hydrochloric acid or a compound able to generate it, for example an organic chloride. Hydrochloric acid is found again in the effluent, particularly in all the gas recycling units and its presence may lead to corrosion inconveniences whenever traces of water are supplied to the plant. In any case, this continuous supply of promoter constitutes a constraint for the user.

According to another proposal, an isomerization catalyst is manufactured by reacting a hydrocarbyl aluminum halide with alumina containing a hydrogenating element, for example platinum. In that case also, the catalyst tends to lose its activity in the course of time.

The invention shows that a catalyst obtained by the hereinafter described method has a stable intrinsic activity and does not require a continuous supply of catalyst promoter, particularly a continuous supply of hydrochloric acid or compounds able to generate it. The suppression of the continuous addition of a volatile inorganic acid and its replacement by the addition of an organic compound of low volatility during the catalyst manufacture offer many advantages.

The invention thus refers to a process for converting hydrocarbons, particularly to a process for isomerizing saturated aliphatic or naphthenic hydrocarbons in the presence of a solid catalyst comprising (a) a carrier containing predominently alumina, which may optionally contain at least one metal or at least one compound of metal having a hydrogenating activity, preferably selected from groups VI-B and/or VIII of the periodic classification, (b) at least one hydrocarbylaromatic compound containing at least two nuclear substituents selected from the hydroxy, oxo and/or hydrocarboxy radicals and (c) and aluminum halide. The latter may be an aluminum trihalide or a hydrocarbyl aluminum halide.

It was not to be expected that catalysts of stable activity might be obtained by contacting the above elements (a), and (b) and (c), since it is known that aluminum trihalides and hydrocarbylaluminum halides are decomposed by hydroxy compounds, for example water and alcohols. It was thus unexpected that polyphenols and their ether derivatives could be used to improve the life time of catalysts of this type.

The carrier consists mainly of alumina. Aluminas which are well adapted to the manufacture of these catalysts are porous aluminas of large specific surface and containing hydrogen which is supposed to be in the form of hydroxy groups. For example, good results may be obtained with aluminas prepared by roasting β alumina trihydrate such as bayerite or a mixture thereof with other roasted alumina hydrates; although aluminas prepared by calcining other hydrates, such as α-alumina trihydrates or gibbsite, α-alumina monohydrates or aluminas obtained by hydrolysis of aluminum alcoholates may also be used. Such aluminas are usually characterized by a high specific surface, usually between 180 and 500 m²/g or more. The most active catalysts are generally obtained when the specific surface is higher than 200 m²/g, particularly higher than 300 m²/g. However, this factor is not the more important since the hydroxy group content also influences the catalytic activity. Thus, the thermal treatments carried out at temperatures from 250° to 800°C, when manufacturing alumina, must be carried out in such manner that a high specific surface and, above all, an optimal hydroxy group content are obtained.

It may be desirable, in such cases, to choose as carrier an alumina having a content of one or more refractory oxides selected from the oxides of metals from groups II-V of the periodic classification. Alumina may thus contain up to 50% by weight of such oxides as silicon, titanium, beryllium, zirconium or magnesium oxides.

We prefer an alumina of relatively low content of one or more metals or metal compounds having a hydrogenating activity and more particularly, pertaining to groups VI and/or VIII of the periodic classification. The preferred metals are those of the platinum group used at a concentration of 0.01–5% by weight and preferably 0.1–2% by weight, Metals of the platinum group which are particularly desirable are platinum and palladium. The catalyst may also contain associated catalytic metals, for example platinum-iridium, platinum-ruthenium, platinum-tungsten, platinum-manganese, platinum-rhenium, platinum-thallium, platinum-palladium, platinum-iridium-thallium or platinum-iridium-manganese; the additional metals may pertain to other groups than groups VI and VIII.

The metal must be as highly dispersed on the catalyst surface as possible, and the methods which give the required dispersion state consist either of precipitating the metal of the platinum group in the form of a sulfide, or of impregnating with chloroplatinic acid or an equivalent acid of another metal, and favoring a homogeneous impregnation by the addition to the medium of compounds giving place to a co-operative chemisorption on the carrier, thus favoring a better distribution of the metal on the catalyst surface. Although not imperative it is preferred to carry out the reduction of the metal compound with hydrogen before supplying aluminum chloride or a hydrocarbyl aluminum chloride. A convenient carrier is a conventional reforming catalyst.

This alumina-containing carrier, optionally comprising a metal of the platinum group, must contain an aromatic compound having at least 2 groups selected from the hydroxy, hydrocarbyloxy and oxo groups.

The aromatic compounds is, for example, a compound of the formula (R)$_m$ Ar (Z)$_x$, where $x$ is an integer of at least 2, preferably from 2 to 4, $m$ is zero or an integer, $(x+m)$ is at most the maximum valence of Ar, Ar is an aromatic radical and the $m$ groups R, identical or different, are substituents, for example halogen atoms or monovalent hydrocarbon radicals, each containing, for example, from one to 20 carbon atoms. The similar or dissimilar groups Z are selected from the group consisting of —OH, =O and —OR', wherein R' is a monovalent hydrocarbon radical, for example alkyl, preferably having 1–6 carbon atoms.

The compound may also be a mixed compound, i.e. one containing both hydroxy groups (OH), oxo groups (=O) and hydrocarbyloxy groups (OR').

In these compounds, certain aromatic rings may be replaced by carbon containing conjugated rings including heteroatoms, for example N or O. A mixture of compounds of these various types may also be used.

Preferably the aromatic compound contains at least one benzene ring substituted with two hydroxy, oxo or hydrocarbyloxy groups of the general formulae:

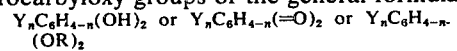

where the $n$ groups Y may be, for example, alkyl, cycloalkyl or aryl groups, optionally condensed with the benzene ring, or electronegative groups such as chlorine or other halogen. For example Y may be methyl, ethyl, n-propyl, iso-propyl, n-butyl, iso-butyl or tert.butyl; $n$ is 0 or an integer such as 1, 2, 3 or 4.

The following compounds containing one benzene ring are examples of compounds containing at least one benzene ring substituted with at least two hydroxy or oxo groups: pyrocatechol, resorcinol, hydroquinone, benzoquinone, quinhydrone and their substitution derivatives: 3,4-dihydroxy toluene, the chloro, fluoro and bromo catechols, the chloro, fluoro and bromo resorcinols, the chloro, fluoro and bromo hydroquinones, the chloro, fluoro and bromoquinones, for example 4-chlorocatechol, 4-chloro resorcinol, tetrachlorohydroquinone, tetrafluorocatechol, chloranil, fluoranil, 2-chloro-1,4-benzoquione, 4-chloro-1,2-benzoquinone, 2,5-dimethyl-1,4-benzoquinone; with respect to polyphenols: pyrogallol, hydroxyquinol and phloroglucinol; with respect to compounds containing several benzene rings: 1,3-dihydroxy naphthalene, 2,3-dihydroxy naphthalene, 1,3-dihydroxy-5,7-naphthalene disulfonic acid, 1,2-dihydroxy anthracene, 9,10-dihydroxy anthracene, 1,2,10-trihydroxyanthracene, 3,4dihydroxy phenanthrene, 2,5-dimethyl-1,4-naphthoquinone, 2-chloro-1,4-naphthoquinone, 1,4-naphthoquinone, 5-hydroxy-1,4-naphthoquinone, 1,8-dihydroxy-2-methyl anthraquinone, 6-bromo-1,4-dihydroxy-9,10-anthraquinone, 1,4-dihydroxy-9,10-anthraquinone, 1,4-anthraquinone, 9,10-phenanthraquinone, 9,10-anthraquinone, acenaphthenequinone, alizarine, chloranilic acid or 1,2,7-trihydroxy-9,10-anthraquinone.

As examples of compounds having at least one benzene ring substituted with at least two hydrocarbyloxy groups or a hydrocarbyloxy group associated with a hydroxy group, we can mention for the compounds containing one benzene ring: 2-(or 3-) methoxy phenol, pyrocatechol dimethyl ether, pyrocatechol diethyl ether, resorcinol dimethyl ether, resorcinol diethyl ether, hydroquinone dimethyl ether, hydroquinone diethyl ether, 2-isopropyl hydroquinone dimethyl ether, chloro-, fluoro- and bromo-pyrocatechols (or resorcinols or hydroquinones) dimethyl ethers, 3-methoxy-4-hydroxy toluene; with respect to polyhydrocarbyloxy and polyhydroxy compounds: phloroglucinol trimethyl ether, pyrogallol trimethylether, 2,3-, 2,6- or 3,5-dimethoxy phenol, 3,4,5-trimethoxy phenol; with respect to compounds containing several benzene rings: 2,3-dimethoxy naphthalene, 1-hydroxy-3-methoxy-naphthalene and 4,5-dihydroxy-7-methoxy anthraquinone.

The above compounds may be used individually or as mixtures. The catalyst may contain from 0.001 to 20% by weight of said compounds, preferably from 0.5 to 10% by weight.

As aluminum trihalide, we can use, for example, a trichloride or tribromide, for example aluminum trichloride or aluminum tribromide. This compound may be supplied to the catalyst by impregnation or sublimation; with respect to AlCl$_3$ and sublimation, the temperatures are about 185°–400°C. Conversely, when working by impregnation, any temperature compatible with an impregnation in liquid phase may be used.

Instead of an aluminum trihalide, we can use a hydrocarbyl aluminum halide of the general formula AlX$_y$R$_{3-y}$ where $y$ may be 1 or 2, X is halogen, preferably chlorine, and R is a monovalent hydrocarbon radical, particularly a straight or branched saturated alkyl radical containing, for example, 1–20 carbon atoms.

Methyl, ethyl, iso-butyl, phenyl, benzyl and cyclohexyl are examples of radical R. By way of examples, the following hydrocarbyl aluminum halides may be used: diethylaluminum chloride, dodecyl aluminum dichloride, diisobutyl aluminum chloride, diphenylaluminum fluoride, benzylaluminum dichloride, cyclohexyl aluminum dichloride and hexyl aluminum diflouride.

The hydrocarbyl aluminum halide may be a well-defined single compound or a mixture (in stoichiometrical or non stoichiometrical proportions) of several compounds; for example, ethyl aluminum sesquichloride of the analytical formula Al$_2$Cl$_3$(C$_2$H$_5$)$_3$ may be used.

Before introducing a hydrocarbyl aluminum halide, it is advantageous to subject the material to be halogenated to a treatment for eliminating, as completely as possible, water and oxygen adsorbed on the catalyst precursor; roasting may be used, provided it is carried out at a temperature at which the so-called constitution OH-groups are not eliminated during the treatment. Thus, with respect to alumina having a specific surface of 5 m$^2$/g or higher, roasting may be carried out at 200°–600°, preferably 300°–500°C. In some cases, it may be advantageous to have the roasting step followed with a hydrogen treatment at 200°–600°C, preferably 300°–500°C, in order to reduce the noble metal deposited on/or incorporated to the selected oxide.

The halide is usually employed as a solution in straight or branched, saturated or unsaturated liquid hydrocarbons comprising, for example, 5–20 carbon atoms, or in other solvents, for example, halogenated hydrocarbons. Pentanes, hexanes and heptanes may be usefully employed. The halide Al $X_y R_{3-y}$ may be used at a concentration ranging up to the limit of solubility of Al $X_y R_{3-y}$ in the selected solvent; since the reaction between the halide and the solid material is often quantitative, nearly all the halogen present as Al $X_y R_{3-y}$ in the solution will be found in the catalyst. It is thus useless, in many cases, to employ an excess of this agent.

The aluminum halide or the hydrocarbyl aluminum halide are usually employed in sufficient amount to supply 1–20% and preferably 4–12% by weight, expressed as halogen, of these compounds to the final catalyst. Values below or above these ranges may also be used.

The supply of aromatic polyhydroxy, polyoxo or polyhydrocarbyloxy compound may be carried out before or after halogenation according to conventional impregnation techniques, for example by contacting the catalyst with a solution of the selected compound in a suitable solvent. By suitable solvent, we mean a solvent which does not destroy the species obtained on the carrier after halogenation. We can mention, as solvents, the chlorinated solvents and the saturated hydrocarbons. The supply of the aromatic polyhydroxy, polyoxo or polyhydrocarbyloxy compound may also be performed during halogenation by injecting a solution of said compound into the halogenation agent or by carrying the selected compound with the inert gas used during halogenation.

The supply of the selected compound may be carried out just after chlorination or during the hydrocarbon isomerization.

The final catalyst contains, as hereinabove stated, from 0.001 to 20% by weight of aromatic polyhydroxy and/or polyoxo and/or polyhydrocarbyloxy compound.

The invention thus concerns a catalyst manufactured in the above manner and also the use of this catalyst for isomerizing saturated hydrocarbons, particularly for isomerizing aliphatic or naphthenic hydrocarbons, so as to obtain products of higher octane number than the feed charge and which may be used in fuels, i.e., $C_4$ or higher branched or unbranched aliphatic or naphthenic hydrocarbons, having a boiling point lower than 200°C, particularly aliphatic or naphthenic hydrocarbons of 4–7 carbon atoms per molecule, for example n-butane, n-pentane, n-hexane, methylpentanes, methyl cyclopentane, cyclohexane, heptane or their mixtures. If only the n-paraffins are to be isomerized, the feed charge may be previously treated for separating n-paraffins from the other hydrocarbons by using separation techniques such as the molecular sieve separation techniques. Topping products from straight distillation, light naphtha fractions and hydrogenated light steam-cracking fractions are examples of industrial mixtures containing these hydrocarbons.

In this process of saturated hydrocarbon isomerization, the feed charge is contacted with the above catalyst in the presence of hydrogen and at a temperature of from 25° to 400°C, particularly from 80° to 200°C. The hydrocarbons may be maintained in the reactor either in the liquid state or in the gas state and the reaction may be carried out at a pressure of from 1 atm. to 150 Kg/cm², preferably from 10 to 70 Kg/cm².

The reaction must be carried out in the presence of hydrogen with a molar ratio of hydrogen to hydrocarbons of, for example, from 0.01 to 20 and preferably from 1.5 to 10. The space velocity of hydrocarbon supply to the reactor is selected from 0.05 to 10 VVH and preferably from 0.2 to 5.0 VVH.

The charge is preferably free of sulfur, water and aromatic hydrocarbons.

The manufacture of the catalyst and its use for isomerizing paraffins at low temperature are illustrated by the following examples:

EXAMPLE 1

(Comparison example)

100 g of a conventional reforming catalyst consisting of alumina containing 0.35% by weight of platinum and 0.4% by weight of chlorine is supplied to a reactor and heated up to 400°C; and air stream is passed therethrough for 2 hours at a hourly rate of 600 liters per liter of catalyst. Temperature is then lowered to 250°C and air replaced with nitrogen. Said nitrogen was previously contacted with aluminum chloride at 200°C: aluminum chloride sublimates, is carried along with nitrogen and condenses on the catalyst. The $AlCl_3$ condensation reaction is exothermic. After a 1 hour treatment, $AlCl_3$ sublimation is discontinued and the temperature of the catalyst bed is raised to 400°C while the nitrogen supply is maintained so as to remove the $AlCl_3$ excess. The resulting catalyst contains 0.34% by weight of platinum and 7.5% by weight of total chlorine; n-pentane is isomerized with this catalyst in the presence of hydrogen under the following conditions:

| | |
|---|---|
| Isomerization temperature | 150°C |
| Reaction pressure | 40 Kg/cm² |
| Molar ratio $H_2$/n-pentane | 4 |
| Space velocity (VVH) | 1 |
| Water content of n-pentane | <20 ppm. |

The reaction products have been analyzed by vapor phase chromatography; their composition is given in the following table:

| Product % by weight | Charge | Time in hours 10 | 15 | 20 | 30 | 50 |
|---|---|---|---|---|---|---|
| Hydrocarbons <$C_5$ | ≤ 0.05 | 0.15 | 0.06 | 0.03 | 0.03 | 0.03 |
| Isopentane | 0.4 | 7.45 | 9.23 | 8.61 | 7.12 | 6.98 |
| n-pentane | 99.1 | 92.99 | 90.48 | 91.14 | 92.62 | 92.76 |
| Cyclopentane | 0.5 | 0.21 | 0.23 | 0.22 | 0.23 | 0.23 |

EXAMPLE 2

100 g of a conventional reforming catalyst, such as mentioned in example 1, is heated up to 400°C in air as in example 1; it is then cooled and impregnated with a 43 g/l solution of pyrocatechol in chloroform at room temperature, so as to obtain a pyrocatechol content of the catalyst, after chloroform evaporation, of 3% by weight. The catalyst is then maintained at 150°C for 2 hours in a nitrogen steam fed at a hourly rate of 600 liters per liter of catalyst. The catalyst is then charged into the isomerization reactor and subjected to chlorination by AlCl₃ sublimation as shown in example 1.

The final catalyst contains 0.345% by weight of platinum and 7.6% by weight of chlorine. n-Pentane is subjected to isomerization with this catalyst under the previously indicated operating conditions.

The reaction products have been analyzed by vapor phase chromatography; they have the following composition:

| Product % by weight | Time in hours Charge | 10 | 20 | 50 | 100 | 200 |
| --- | --- | --- | --- | --- | --- | --- |
| Hydrocarbons <C₅ | ≤ 0.05 | 0.1 | 0.15 | 0.1 | 0.1 | 0.1 |
| Isopentane | 0.4 | 45.0 | 52.25 | 63.0 | 63.1 | 63.0 |
| n-pentane | 99.1 | 54.5 | 47.25 | 36.6 | 36.5 | 36.5 |
| Cyclopentane | 0.5 | 0.4 | 0.35 | 0.3 | 0.3 | 0.4 |

EXAMPLE 3

100 g of the conventional reforming catalyst of example 1 is heated to 290°C in a nitrogen stream of 600 l per liter of catalyst per hour. After scavenging for 1 hour with a nitrogen steam, the catalyst is cooled and a 5% by weight solution of 1,2-dimethoxy benzene in n-hexane is fed at room temperature for 10 hours at a hourly feed of 12 cc per hour. After scavenging with nitrogen at 290°C, the temperature is brought to 250°C and a chlorination treatment by means of AlCl₃ takes place as described in example 1; n-pentane is then isomerized under the above stated conditions:

The results are summarized in the following table:

| Products % by weight | Time in hours Charge | 10 | 20 | 50 | 100 | 200 |
| --- | --- | --- | --- | --- | --- | --- |
| Hydrocarbons <C₅ | ≤ 0.05 | 0.25 | 0.15 | 0.10 | 0.10 | 0.10 |
| Isopentane | 0.4 | 42.15 | 58.3 | 62.3 | 65.1 | 64.5 |
| n-pentane | 99.1 | 57.30 | 41.25 | 37.3 | 34.5 | 36.1 |
| Cyclopentane | 0.5 | 0.30 | 0.30 | 0.30 | 0.30 | 0.30 |

EXAMPLE 4

Example 3 is repeated, except that the chlorination by means of AlCl₃ is carried out before feeding 1,2-dimethoxy benzene. Then, as shown in example 3, the catalyst is used for isomerizing n-pentane.

The results are summarized in the following table:

| Products % by weight | Time in hours Charge | 10 | 20 | 50 | 100 | 200 |
| --- | --- | --- | --- | --- | --- | --- |
| Hydrocarbons <C₅ | ≤ 0.05 | 0.15 | 0.1 | 0.1 | 0.1 | 0.1 |
| Isopentane | 0.4 | 42.3 | 48.4 | 57.6 | 62.7 | 61.9 |
| n-pentane | 99.1 | 57.25 | 51.2 | 42.0 | 37.9 | 37.7 |
| cyclopentane | 0.5 | 0.3 | 0.3 | 0.3 | 0.3 | 0.3 |

EXAMPLE 5

100 g of the reforming catalyst of example 1 is charged into an isomerization reactor and heated to 290°C under a nitrogen stream at a hourly rate of 600 l per liter of catalyst.

After scavenging for 1 hour with a nitrogen stream, the temperature is brought to 150°C and a solution of 1,2-dimethoxy benzene and aluminum chloride in ether, containing 5% by weight of 1,2-dimethoxy benzene and 15% by weight of aluminum chloride, is fed for 10 hours at a rate of 12 cc per hour.

After impregnation, nitrogen is passed therethrough for 1 hour at 250°C.

n-Pentane is then isomerized under the same operating conditions.

The results are summarized in the following table:

EXAMPLES 6–12

100 g of catalyst consisting of alumina (ν-alumina content: about 75% by weight; specific surface: 350m²/g) containing 0.35% by weight of platinum (in example 8, the catalyst contains 0.15% of palladium) is

| Products % by weight | Time in hours Charge | 10 | 20 | 50 | 100 | 200 |
| --- | --- | --- | --- | --- | --- | --- |
| Hydrocarbons <C₅ | ≤ 0.05 | 0.1 | 0.1 | 0.1 | 0.1 | 0.1 |
| Isopentane | 0.4 | 48.2 | 55.5 | 65.2 | 65.5 | < 65.5 |
| n-pentane | 99.1 | 61.4 | 44.1 | 34.4 | 34.1 | 34.1 |
| Cyclopentane | 0.5 | 0.3 | 0.3 | 0.3 | 0.3 | 0.3 | charged into an isomerization reactor and heated up to 250°C while nitrogen is passed therethrough at a rate of 600 liters per liter of catalyst per hour. Chlorination is then carried out by sublimating 20 g of aluminum chloride as shown in example 1.

The temperature is then lowered to 150°C and nitrogen is replaced by hydrogen. A solution of aromatic poly (hydroxy, oxo or hydrocarbyloxy) compound in a mixutre by equal parts of n-pentane and n-hexane is fed thereinto. When the desirable amount of the selected aromatic compound has been supplied to the catalyst, a mixture of n-pentane and n-hexane by equal parts is isomerized under the following operating conditions:
— temperature of the isomerization reactor: 130°C
— reactor pressure: 20 kg/cm$^2$
— molar ratio of hydrogen to the hydrocarbons: 2
— feeding rate of the $nC_5nC_6$ mixture: 1 VVH
— water content of the feed charge < 10 ppm The results are summarized in the following table indicating the nature of the charged compound, the amount of this compound, expressed in % by weight with respect to the catalyst, and the analysis of the effluent after 50 and 100 hours of run.

enged with dry hydrogen fed at a hourly rate of 50 liters per liter of catalyst at 50°C under 2 bars absolute. 1 liter of a solution containing 0.2 mole/liter of $AlCl_2(C_2H_5)$ in normal heptane is supplied thereto by means of a pump, at a rate of 500 cc per hour, and the reactor effluent is recycled.

After a 8 hours circulation, the pump is stopped, the solvent is discharged and the solid material is dried under hydrogen atmosphere.

n-pentane is then subjected to isomerization under the above conditions, i.e.:
— temperature of the isomerization reactor: 150°C
— reactor pressure: 40 bars
— molar ratio $H_2$/hydrocarbons: 4
— space velocity (VVH): 1
— water content of n-pentane < 20 ppm The reaction products are analyzed by vapor phase chromatography; they have the following composition:

| Time in hours<br>Products<br>% by weight | Charge | 10 | 15 | 30 | 50 | 100 |
|---|---|---|---|---|---|---|
| Hydrocarbons <$C_5$ | ≤ 0.05 | 0.15 | 0.07 | 0.04 | 0.04 | 0.0 |
| Isopentane | 0.4 | 10.40 | 11.23 | 7.80 | 6.96 | 6.9 |
| n-pentane | 99.1 | 88.95 | 87.20 | 91.66 | 92.50 | 92.5 |
| Cyclopentane | 0.5 | 0.50 | 0.50 | 0.50 | 0.50 | 0.5 |

EXAMPLE 14

As in example 13, we place in the isomerization reactor, 100 g of the previously calcined conventional re-

| Ex. No. | Compound | Amount %b.w. | Analysis after 50h | | | Analysis after 100h | | |
|---|---|---|---|---|---|---|---|---|
| | | | %<$C_5$ | %iso$C_5$/Σ$C_5$ | %iso$C_6$/Σ$C_6$ | %<iso$C_5$ | %iso$C_5$/Σ$C_5$ | %iso$C_6$/Σ$C_6$ |
| 6 | 2-methoxy phenol | 1.5 | 0.1 | 74.5 | 88.5 | 0.15 | 78.0 | 88.0 |
| 7 | p-dimethoxy benzene | 3.0 | 0.25 | 68.9 | 73.3 | 0.25 | 70.0 | 80.5 |
| 8* | chloranil | 2.4 | 0.10 | 59.5 | 62.25 | 0.10 | 72.6 | 84.0 |
| 9 | pyrogallol trimethyl ether | 0.6 | 0.20 | 49.5 | 68.10 | 0.15 | 58.0 | 70.1 |
| 10 | 1,2-diethoxy benzene | 5.9 | 0.10 | 75.0 | 83.55 | 0.20 | 72.5 | 83.8 |
| 11 | 3-methoxy-4-hydroxy-toluene | 6.8 | 0.30 | 68.0 | 79.0 | 0.25 | 68.0 | 81.0 |
| 12 | 3,5-dimethoxy phenol | 3.0 | 0.35 | 74.0 | 84.0 | 0.25 | 73.55 | 83.0 |

*This catalyst contains 0.15 % of palladium instead of platinum.

EXAMPLE 13

(given for comparison)

100 g of a conventional reforming catalyst containing 0.6% by weight of platinum on alumina having a specific surface of 416 m$^2$/g and a pore volume of 0.6 cc/g is calcined in air for 1 hour at 400°C and placed in an isomerization reactor.

The reactor is immediately closed and vacuum is applied thereto by means of a pump for 1 hour; then the reactor is filled with hydrogen under pressure and scavforming catalyst.

After treatment with a solution of dichloroethyl aluminum, as in example 13, and while working as described in this example, the temperature is raised to 150°C, the hydrogen feed rate being kept unchanged.

A solution of 2 g of benzoquinone per liter of n-pentane is fed for 2 hours at a rate of 100 cc per hour.

n-pentane is then isomerized under the conditions of example 13.

The products are analyzed by vapor phase chromatography; they have the following composition in the course of time:

| Time in hours<br>Products<br>% b.w. | Charge | 10 | 15 | 30 | 50 | 100 |
|---|---|---|---|---|---|---|
| Hydrocarbons <$C_5$ | ≤ 0.05 | 0.12 | 0.15 | 0.10 | 0.17 | 0.20 |

-continued

| Time in hours Products % b.w. | Charge | 10 | 15 | 30 | 50 | 100 |
|---|---|---|---|---|---|---|
| Isopentane | 0.40 | 42.30 | 50.80 | 68.20 | 67.50 | 68.00 |
| n-pentane | 99.10 | 57.10 | 48.70 | 31.40 | 32.00 | 31.50 |
| Cyclopentane | 0.50 | 0.48 | 0.35 | 0.30 | 0.33 | 0.30 |

EXAMPLE 15

— water content of the feedstock < 10 ppm by weight.

| Ex. No. | Compound | Amount % b.w. | <C$_5$% | Analysis after 50h %isoC$_5$/ΣC$_5$ | %isoC$_6$/ΣC$_6$ | <C$_5$% | Analysis after 100h %isoC$_5$/ΣC$_5$ | %isoC$_6$/ΣC$_6$ |
|---|---|---|---|---|---|---|---|---|
| 16 | Pyrocatechol | 0.8 | 0.15 | 70.5 | 80.8 | 0.20 | 72.0 | 86.0 |
| 17 | Chlorohydroquinone | 1.6 | 0.30 | 74.5 | 84.5 | 0.25 | 74.0 | 82.0 |
| 18 | Fluoranil | 2.5 | 0.25 | 78.5 | 85.0 | 0.25 | 78.5 | 87.0 |
| 19 | Alizarine | 1.0 | 0.45 | 61.0 | 74.0 | 0.35 | 68.0 | 74.5 |
| 20 | Anthraquinone | 5.0 | 0.10 | 60.0 | 85.0 | 0.20 | 58.5 | 80.0 |
| 21 | 4-methoxy phenol | 2.0 | 0.15 | 64.0 | 79.5 | 0.25 | 69.5 | 80.0 |

Example 14 is repeated, except that the order of supply of AlCl$_2$C$_2$H$_5$ and benzoquinone is reversed. n-Pentane is isomerized under the same operating conditions. The results are summarized in the following table:

| Products % b.w. | Time in hours Charge | 10 | 15 | 30 | 50 | 100 |
|---|---|---|---|---|---|---|
| Hydrocarbons <C$_5$ | ≤ 0.05 | 0.15 | 0.15 | 0.10 | 0.10 | 0.10 |
| Isopentane | 0.40 | 35.25 | 42.20 | 56.20 | 59.70 | 63.50 |
| n-pentane | 99.10 | 64.30 | 57.30 | 43.40 | 39.90 | 36.10 |
| Cyclopentane | 0.50 | 0.30 | 0.35 | 0.30 | 0.30 | 0.30 |

EXAMPLES 16–21

100 g of a catalyst consisting of alumina having an $\nu$-alumina content of about 80% by weight, a specific surface of 400 m²/g and containing 0.6% by weight of platinum is first calcined in air at 400°C and then placed in an isomerization reactor.

The reactor is then scavenged at room temperature with a stream of dry hydrogen supplied at a hourly rate of 50 l.H$_2$ per liter of catalyst, for 2 hours; then, the temperature is raised to 150°C, the pressure to 20 bars absolute, the hydrogen stream being kept unchanged. 600 cc of a solution containing 0.2 mole of Al$_2$Cl$_3$(C$_2$H$_5$)$_3$ is then injected at a rate of 50 cc per hour without recycling of the reactor effluent.

The catalyst is then impregnated with a solution of an aromatic poly (hydroxy, hydrocarbyloxy or oxo) compound in n-hexane at room temperature, so that the content of aromatic compound after solvent vaporization is the same as the % by weight with respect to the catalyst, as given in the following table.

A light gasoline is then isomerized, its composition in % by weight being the following: isopentane: 17.6, n-pentane: 28.0, isohexanes: 24.7, n-hexane: 24.6, naphtenes: 4.1, n-heptane: 1.

The conditions are as follows:
— temperature: 130°C
— reactor pressure: 40 kg/cm²
— molar ratio H$_2$/hydrocarbons: 2.5
— light gasoline feed rate: 1 VVH (volume/catalyst volume/hour)
— water content of the feedstock < 10 ppm by weight.

What we claim is :

1. A process for the isomerization of a member selected from the group consisting of saturated aliphatic hydrocarbons, naphthenic hydrocarbons and mixtures thereof, said process comprising contacting said member at a temperature of 25°–400°C with a catalyst consisting essentially of an alumina carrier having incorporated therewith, at least one hydrogenating metal from Group VI-B, or compound thereof, and/or Group VIII, or compound thereof compound, at least one aluminum halide or hydrocarbylaluminum halide, and at least one hydrocarbylaromatic compound substituted by at least two substituents, said substituents being the same or different and selected from the group consisting of hydroxy, oxo and hydrocarbyloxy.

2. A process according to claim 1, wherein said catalyst is prepared by admixing said halide with said carrier before admixing said hydrocarbylaromatic compound.

3. A process according to claim 1, wherein said halide is aluminum trichloride and is added to said catalyst by sublimation at a temperature of 185°–400°C.

4. A process according to claim 1, wherein said halide is added to said catalyst in the form of a hydrocarbylaluminum halide.

5. A process according to claim 1, wherein said hydrogenating metal compound is a compound of a metal from groups VI-B and/or VIII.

6. A process according to claim 1, wherein said hydrogenating metal compound is a platinum compound.

7. A process according to claim 1, wherein said halide is a hydrocarbylaluminum halide.

8. A process according to claim 1, wherein said hydrocarbylaromatic compound has the formula $(R)_m Ar(Z)_x$ where x is an integer of at least 2, m is zero or an integer, Ar is an aromatic radical the sum $(x + m)$ being at most the maximum valence of Ar, and Z is any of —OH, =O and —OR', where R' is a monovalent hydrocarbon radical.

9. A process as defined by claim 1, wherein the isomerization is conducted at 80°–200°C.

10. A process as defined by claim 1, wherein said member isomerized is a naphthenic hydrocarbon.

* * * * *